United States Patent [19]

Nagata et al.

[11] Patent Number: 5,243,421
[45] Date of Patent: Sep. 7, 1993

[54] SIGNAL PROCESSOR FOR A WIDE TELEVISON RECEIVER

[75] Inventors: Tatsuo Nagata, Fujisawa; Shigeru Hirahata, Yokohama; Kenji Katsumata, Yokohama; Shinobu Torikoshi, Yokohama; Mitsuo Konno, Chigasaki, all of Japan

[73] Assignee: Hitachi, Ltd., Tokyo, Japan

[21] Appl. No.: 772,162

[22] Filed: Oct. 7, 1991

[30] Foreign Application Priority Data

Oct. 5, 1990 [JP] Japan ................. 2-266202

[51] Int. Cl.⁵ ............................. H04N 7/01
[52] U.S. Cl. .................... 358/140; 358/180; 358/230
[58] Field of Search ............ 358/140, 141, 11, 12, 358/180, 22, 230, 148

[56] References Cited

U.S. PATENT DOCUMENTS

| 4,864,405 | 9/1989 | Chambers | 358/180 |
| 4,897,722 | 1/1990 | Flory | 358/180 X |
| 4,953,025 | 8/1990 | Saitoh et al. | 358/230 X |
| 4,984,078 | 1/1991 | Skinner et al. | 358/140 X |

FOREIGN PATENT DOCUMENTS

A16336693 7/1986 Japan .
A16378685 9/1986 Japan .
A1194784 1/1988 Japan .

Primary Examiner—Victor R. Kostak
Attorney, Agent, or Firm—Antonelli, Terry, Stout & Kraus

[57] ABSTRACT

A wide television receiver which converts a video input signal having an aspect ratio 4:3 or 16:9 into a display format permitting selecting of display with horizontal compression, without horizontal compression, with vertical magnification, or without vertical magnification to present the display on a wide display having an aspect ratio 16:9.

6 Claims, 13 Drawing Sheets

DISPLAY WITH HORIZONTAL COMPRESSION

DISPLAY WITHOUT HORIZONTAL COMPRESSION

DISPLAY WITH VERTICAL MAGNIFICATION

FIG. I

DISPLAY WITH HORIZONTAL COMPRESSION

DISPLAY WITHOUT HORIZONTAL COMPRESSION

DISPLAY WITH VERTICAL MAGNIFICATION

DISPLAY WITH HORIZONTAL COMPRESSION

DISPLAY WITHOUT HORIZONTAL COMPRESSION

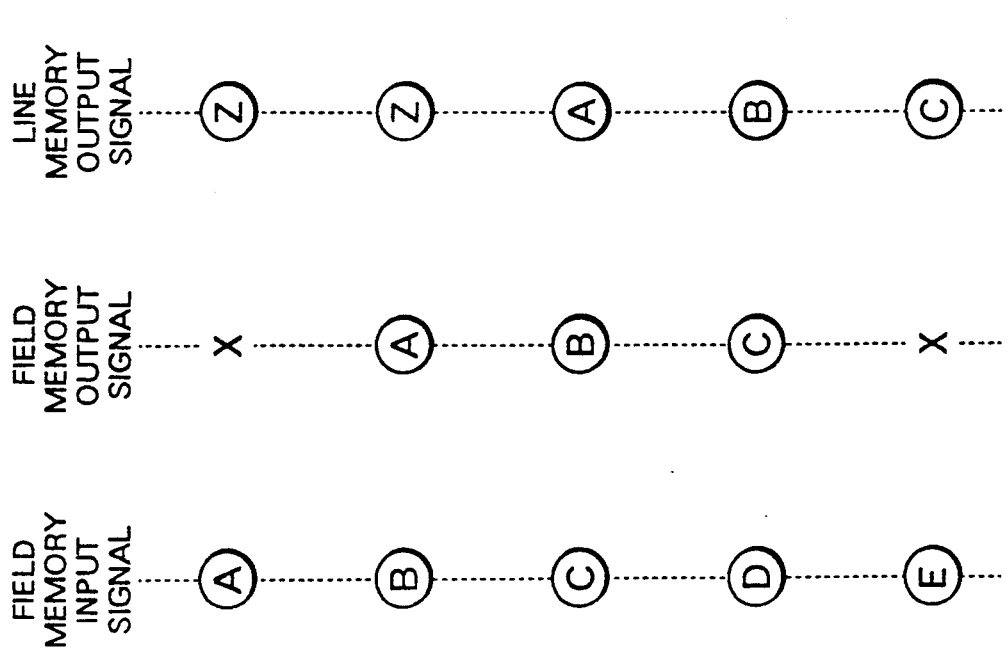
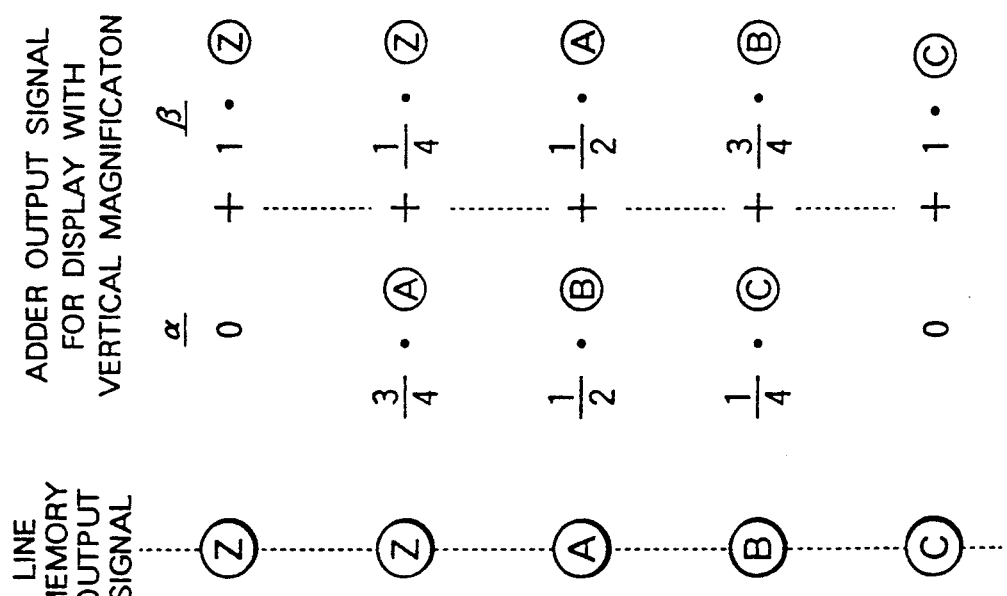
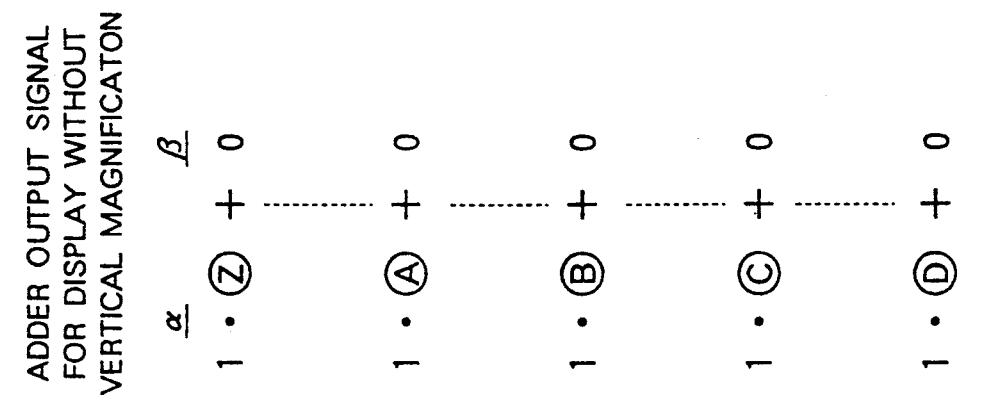

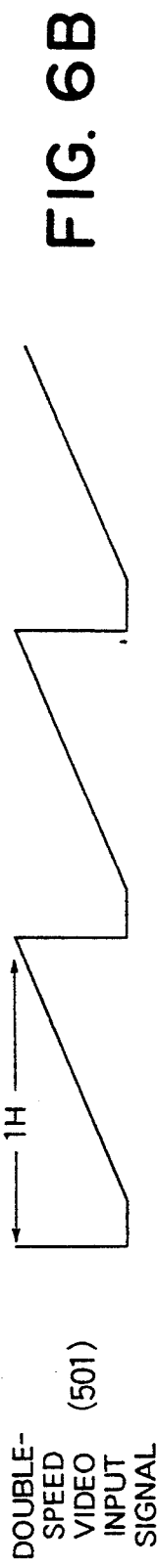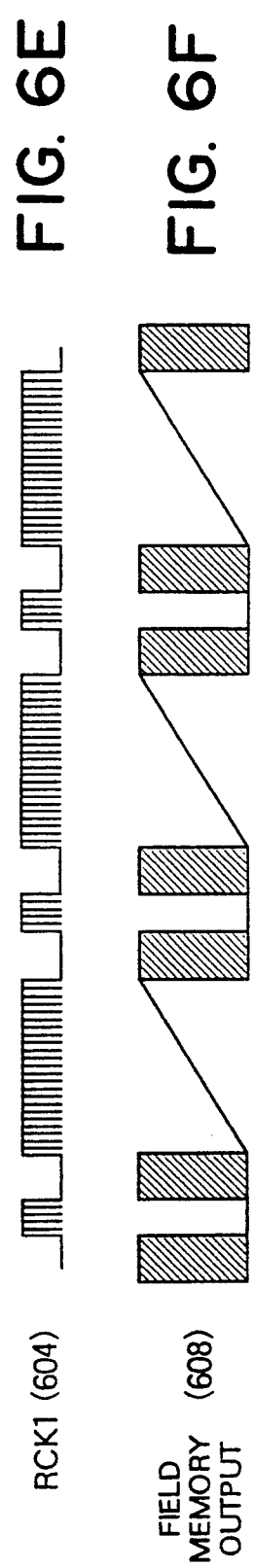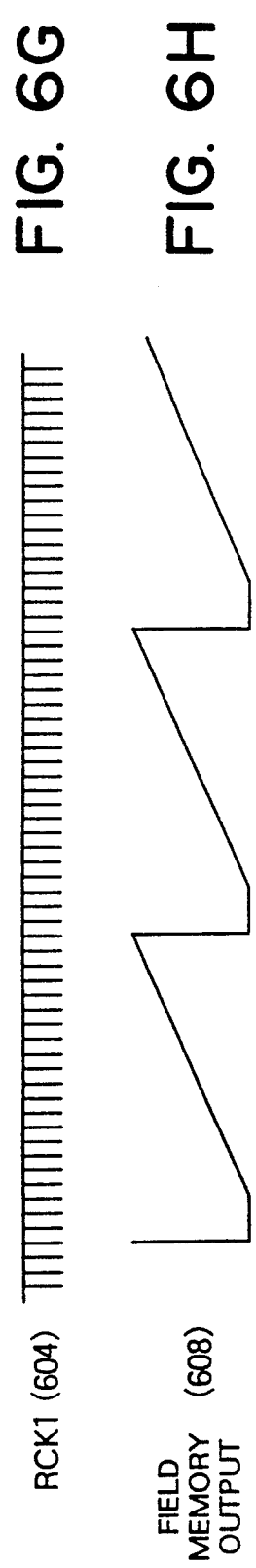
FIG. 6B
FIG. 6C
FIG. 6D
FIG. 6E
FIG. 6F
FIG. 6G
FIG. 6H

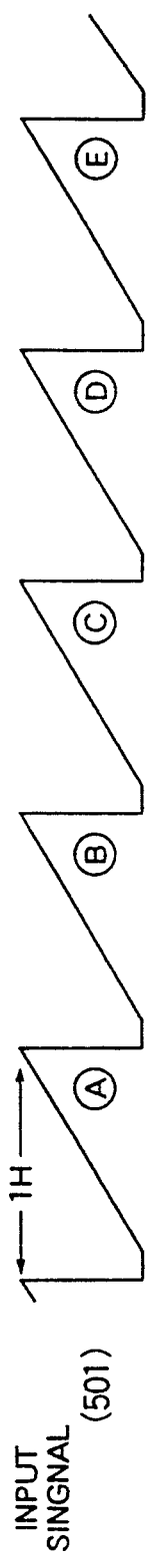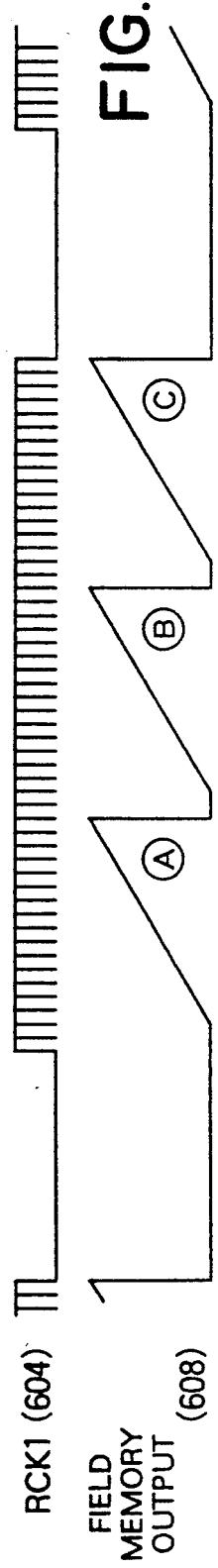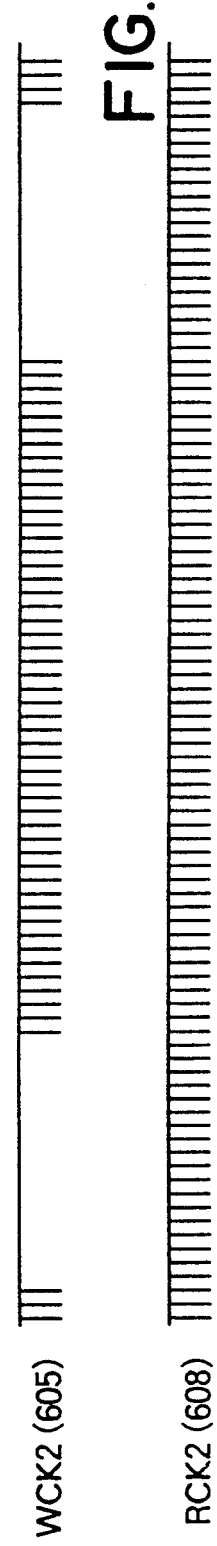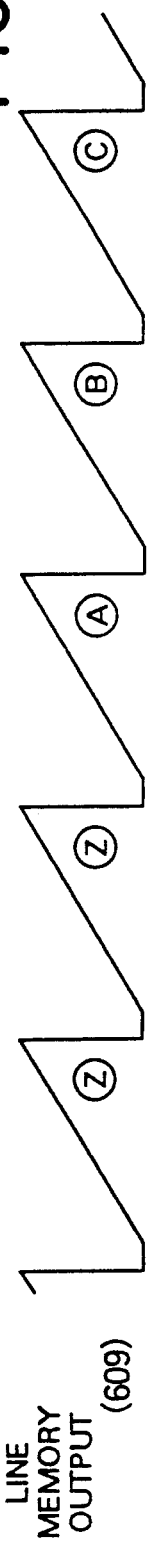
FIG. 7A FIG. 7B FIG. 7C FIG. 7D FIG. 7E FIG. 7F

SIGNAL PROCESSOR FOR A WIDE TELEVISON RECEIVER

BACKGROUND OF THE INVENTION

The present invention relates to a wide aspect ratio television receiver including a display having an aspect ratio of 16:9, and in particular, to a television signal processor capable of displaying video signals having different aspect ratios on the display.

Recently, attention has been given to broadcasting of video signals having an aspect ratio 16:9, such as for example in the high definition television system and a second-generation EDTV system, which are different from television systems conforming to the conventional National Television System Committee (NTSC).

However, since the present NTSC television system is widely used throughout the world, in order for the broadcasting system of a high picture quality such as the high definition television broadcasting or the second-generation EDTV systems to be widely used throughout the world, the NTSC image of the standard ratio 4:3 is required to be displayed with the aspect ratio 16:9 of the newer TV systems for establishing compatibility therebetween.

An example of displaying an image the aspect ratio 4:3 on a display of the aspect ratio 16:9 has been described in the JP-A-1-194784. FIG. 2 shows a block diagram of the overall configuration of a circuit system described in the JP-A-1-194784.

FIG. 2 includes an input terminal 201 for receiving a video signal, a Y/C separating circuit 202, a line memory 203, a wide display 204, a synchronizing signal reproducing circuit 205, a write control PLL circuit 206, a read control PLL circuit 207, and a variable vertical deflection circuit 208.

A video input signal supplied from the input terminal 201 is separated by the Y/C separating circuit 202 into a luminance signal and color difference signal, which are then subjected to a time-axis compression in the horizontal direction so as to be presented on the wide display 204. In addition, the synchronizing signal (sync) reproducing circuit 205 separates a synchronizing signal from the video input signal. In response to the synchronizing signal, the write control PLL circuit 206 generates clock and control signals associated with a write operation of the line memory 203 and the read control PLL circuit 207 generates clock and control signals associated with a read operation of the line memory 203. Moreover, the sync reproducing circuit 205 supplies the synchronizing signal also to the variable vertical deflection circuit 208 which drives the wide display 204.

The circuit of FIG. 2 has the following features.

1) The line memory 203 stores video signals received in one-horizontal period (1H) such that using a write clock reproduced by the write control PLL circuit 206 from the signal outputted from the sync reproducing circuit 205 and a read clock which is produced by the read control PLL circuit 207 and which has a frequency equal to 4/3 of the frequency of the write clock, a time compression in a horizontal direction is developed.

2) In the wide display 204, the vertical deflection can be variably achieved so as to support a function of an expansion and magnification in the vertical direction.

With the features above, images respectively having aspect ratios 16:9 and 4:3 can be presented on a display of an aspect ratio 16:9.

However, when video input signals include signals associated with different screen display areas employed in the current broadcasting systems and film software systems of the CineScope and Vista sizes, an advantageous feature is achieved that the film software images can be displayed fully on the screen and the signal of an aspect ratio 4:3 can be presented in a desired position of the screen having an aspect ratio 16:9.

However, in the prior art described above, when the input signal contains a large amount of jitter components like in a VTR signal, the vertical lines of the screen appear in as twisted or distorted images. Moreover interpolation between scanning lines is not taken into consideration during image magnification in the vertical direction which caused the following problems.

1) A phase-locked loop (PLL) is required for clock generation on a signal processing side and a PLL is required for a synchronization signal reproduction on the display side. These PLLs respond differently to a synchronization deviation causing responses such as a jitter and a skew which cannot be completely eliminated.

2) A vertical magnification function achieved by changing the vertical deflection of the display expands the interval between the scanning lines to accomplish the vertical magnification. Consequently, the scanning line structure becomes to much more visible. In addition, it is necessary to additionally dispose a change-over signal for a change-over to a deflection driver of the display or the like.

SUMMARY OF THE INVENTION

It is therefore a first object of the present invention to provide a wide television receiver in which the video image deviation or fluctuation with respect to jitter and skew of the input signal is suppressed to the maximum extent during display of a video signal having a converted aspect ratio.

A second object of the present invention is to provide a wide television receiver in which the vertical magnification is accomplished through an interpolation between the scanning lines which presents a finer image than the prior art.

A third object of the present invention is to provide a wide television receiver having a memory used for the aspect ratio conversion processing permitting special display functions including at least the still, zooming, and multi-screen display functions.

A first aspect of the embodiments of the invention is a display device having a wide aspect ratio, a video signal processing circuit for generating at least a real scanning line signal and an interpolation scanning line signal from a video signal inputted to carry out a double-speed conversion, a display format conversion circuit for converting a video signal outputted from the video signal processing circuit by use of a memory into a format to be displayed on the display device, a synchronizing signal (sync) reproducing circuit for reproducing a synchronizing signal from the inputted video signal and controlling the video signal processing circuit and the display format conversion circuit, a fixed frequency generating device for generating a plurality of types of control signals based on a fixed frequency and controlling the display format conversion circuit and the display device, and a display format setting circuit for setting the display format conversion circuit and the fixed frequency generating circuit.

Another aspect of the embodiments of the invention resides in that the display format conversion memory circuit comprises a first memory for storing therein a video signal outputted from the video signal processing circuit, a second memory for storing therein a video signal, a first coefficient circuit controlled by the display format setting circuit for weighting a video signal outputted from the first memory, a second coefficient circuit controlled by the display format setting circuit for weighting a video signal outputted from the second memory, and an adder circuit for adding to each other signals outputted respectively from the first and second coefficient circuits.

Still another aspect of the embodiments of the invention resides in a special display control circuit for controlling the synchronizing signal reproducing circuit and the fixed frequency generating circuit.

The video signal processing circuit achieves a double-speed conversion on at least the real scanning line signal and the interpolation scanning line signal contained in the video input signal to supply a double-speed video signal to the display format conversion circuit. The synchronizing signal reproducing circuit reproduces a synchronizing signal to be fed to the video signal processing circuit, a control signal to be delivered to a memory of the display format conversion circuit, and a synchronizing signal to be supplied to the fixed frequency generating circuit from the video input signal. The display format setting circuit produces horizontal aspect ratio conversion setting signals for displays respectively with and without a horizontal compression to supply the signals to the fixed frequency generating circuit. The fixed frequency generating circuit generates two types of fixed frequencies with a frequency ratio 4:3 therebetween to produce from the fixed frequencies, based on the synchronizing signal reproduced by the sync reproducing circuit, at least two groups of clock and control signals respectively for the memories of the display format conversion circuit respectively associated with the displays with and without horizontal compression. Depending on the horizontal aspect ratio conversion setting signal established by the display format setting circuit, either one of the two groups of signals is selected to be supplied to the display format conversion circuit. In response thereto, the display format conversion circuit converts the doublespeed video signal inputted from the video signal processing circuit into two display formats i.e. the displays with and without horizontal compression, thereby obtaining a stable video signal free from the synchronizing signal deviation.

In addition, the display format setting circuit supplies the vertical aspect ratio conversion setting signals for the displays with and without vertical magnification to the fixed frequency generating circuit and the display format conversion circuit. In the display format conversion circuit, under control of the fixed frequency generating circuit, the first and second memories read out therefrom scanning line signal contents identical to each other in the vertical direction. Moreover, coefficients respectively of the first and second coefficient circuits are controlled according to the display state established by the vertical aspect ratio conversion setting signal so as to accomplish a filtering operation on the obtained signal in the vertical direction, which enables the interpolation to be conducted on the scanning line signals.

As a result, a video signal magnified in the vertical direction can be generated, like in the case of the horizontal aspect ratio conversion above, as a stable video signal free from the synchronizing signal deviation.

Moreover, the special display control circuit controls the sync reproducing circuit and the fixed frequency generating circuit to achieve control operations. Examples of control operations are stopping reading and writing operations and to change the clock frequency for the memories used in the display format conversion circuit to provide special display functions such as still, zooming, and multi-screen display functions.

According to the embodiments of the invention, based on a video input signal containing a jitter component, there can be obtained an image with a reduced unstableness, namely, a stable image can be displayed. Moreover, thanks to the signal conversion achieved through the read control operation of the memories for the signal conversion and the filtering operation, it is possible to display images with the horizontal and vertical magnification based on signals having been processed to produce aspect ratio conversion. Furthermore, special display functions such as the still, zooming, and multi-screen display functions can be accomplished by using the memories prepared for the signal conversion processing.

BRIEF DESCRIPTION OF THE DRAWINGS

These and other objects and advantages of the present invention will become apparent by reference to the following description and accompanying drawings wherein:

FIGS. 5B to 5F are diagrams used for explaining control operations of video signal scanning lines;

FIGS. 6B to 6H are waveforms showing video signals and control signals;

FIGS. 7A to 7F are waveforms for explaining video signals and control signals related to the field and line memories in a display with vertical magnification;

DESCRIPTION OF THE PREFERRED EMBODIMENTS

Figure 1:
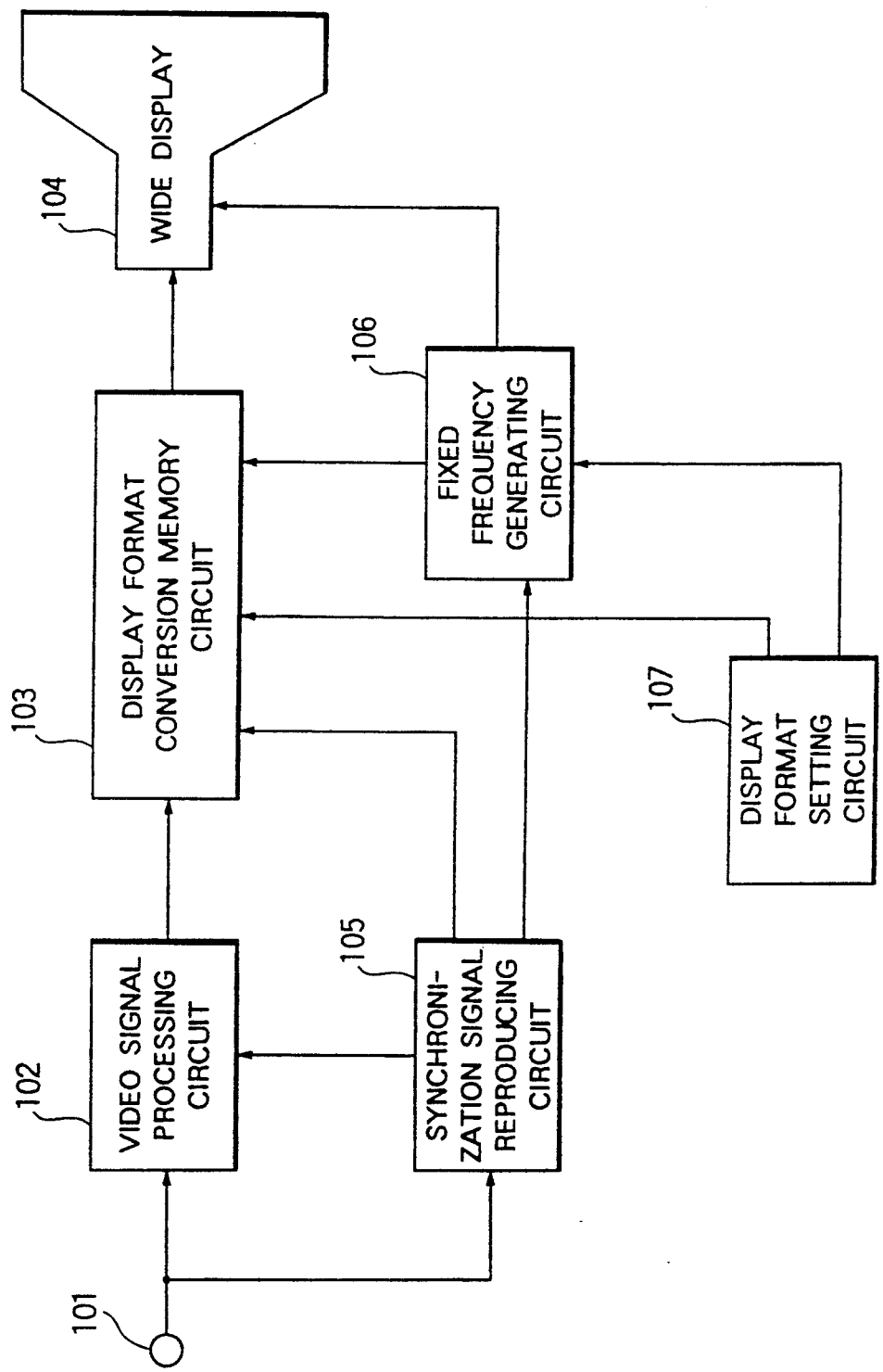
FIG. 1 is a block diagram schematically showing an embodiment of a wide television receiver according to the present invention.
Figure 2:
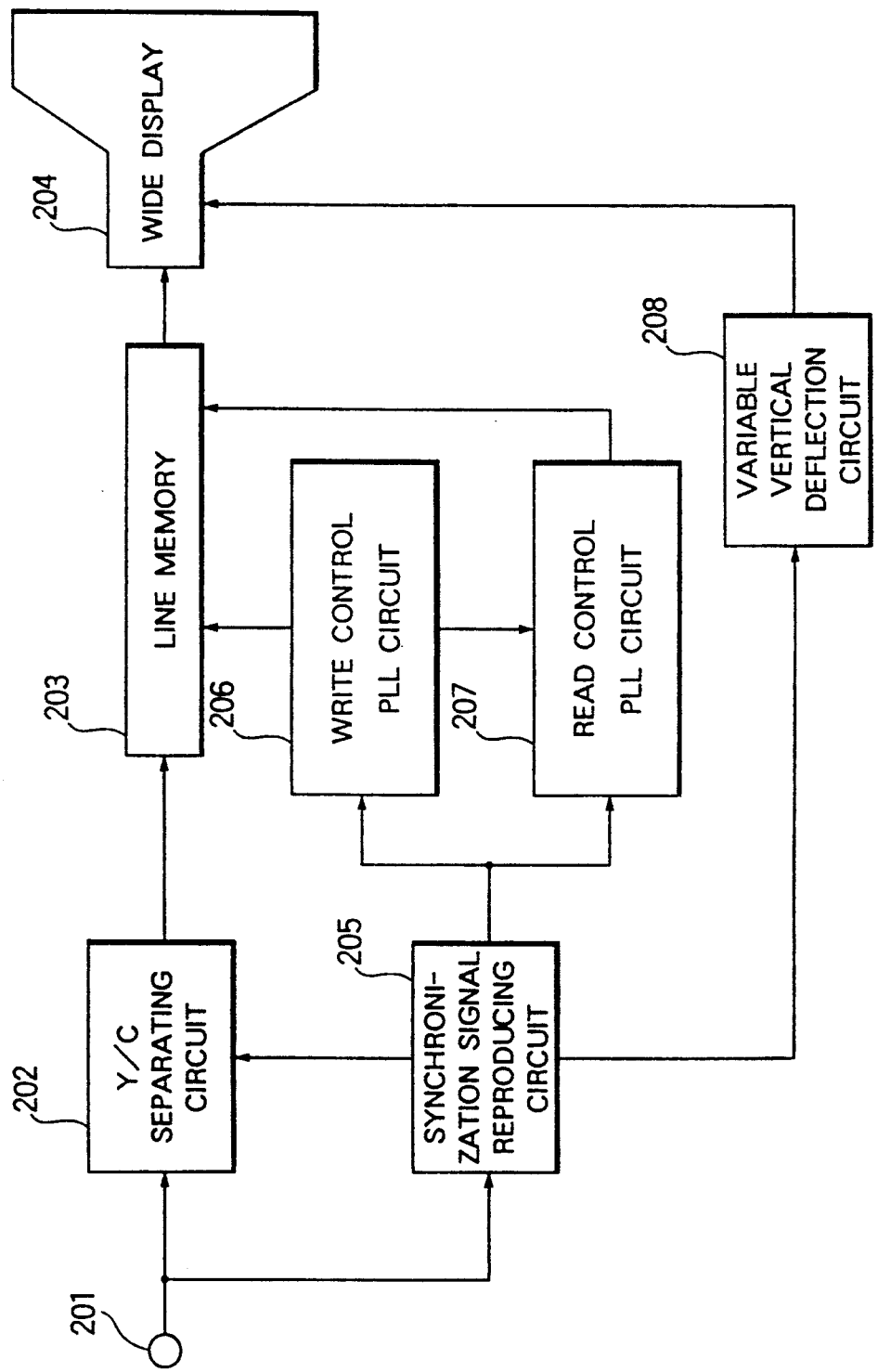
FIG. 2 is a block diagram showing an example of a conventional wide television receiver.

Referring now to the drawings, a description will be given of an embodiment according to the present invention.

First, a feature of this embodiment resides in a video input signal having an aspect ratio 4:3 or 16:9 which is subjected to a double-speed conversion and then the resultant signal is converted into a display format related to the display with horizontal compression, display without horizontal compression, display with vertical magnification, or display without vertical magnification, to produce an image on a wide display having an aspect ratio 16:9.

The feature of this embodiment will be specifically described. FIG. 1 includes an input terminal 101 for receiving a video input signal, a video signal processing circuit 102, a display format conversion memory circuit 13, a fixed frequency generating circuit 106, and a display format setting circuit 107.

A video input signal supplied from the input terminal 101 is fed to the video signal processing circuit 102, which then separates a luminance signal and a color signal from the NTSC television signal to generate a real scanning line signal and an interpolation scanning line signal. The interpolation scanning line signal may represent a mean value of the real scanning line signal or the real scanning line signal obtained from the previous field. As a result, there is achieved double-speed conversion processing in which the sequential scanning can be conducted at a speed twice as high as the scanning speed of the standard television signal. A double-speed video signal outputted from the video signal processing circuit 102 is received by the display format conversion memory circuit 103, which in turn converts the display format thereof to display an image on the wide display 104 having an aspect ratio 16:9. The sync reproducing circuit 105 reproduces from the video input signal a synchronizing signal to be fed to the video signal processing circuit 102. Moreover, the sync reproducing circuit 105 reproduces clock and control signals for a write operation to be delivered to the display format conversion memory circuit 103. In addition, the sync reproducing circuit 105 reproduces a synchronizing signal to be supplied to the fixed frequency generating circuit 106. The fixed frequency generating circuit 106 generates, based on different fixed frequencies generated from fixed frequency generators integrally disposed therein and a synchronizing signal from the sync reproducing circuit 105, two kinds of clock signals and two kinds of control signals for a read operation to acquire video signals stored in the display format conversion memory circuit 103 and two kinds of synchronizing signals associated with the wide display 104. The display format setting circuit 107 generates change-over signals for the two kinds of clocks, two kinds of control signals, and two kinds of synchronizing signals created from the fixed frequency generating circuit 106 and a control signal controlling the display format conversion so as to supply the signals to the associated circuits. The control signal is delivered from the display format setting circuit 107 to the display format conversion memory circuit 103, which will be described later in detail by referring to FIG. 5A.

Consequently, the read control on the memories used for the display format conversion processing by the display format conversion memory circuit 103 is conducted depending on a control signal which is generated from the fixed frequency generating circuit 106 asynchronous with the video input signal and which is free from such a variation as jitter with respect to time. As a consequence, based on a video signal such as a VTR signal containing relatively large number of jitter components and skew, a high-quality image can be produced with an improved stability.

Figure 3A:
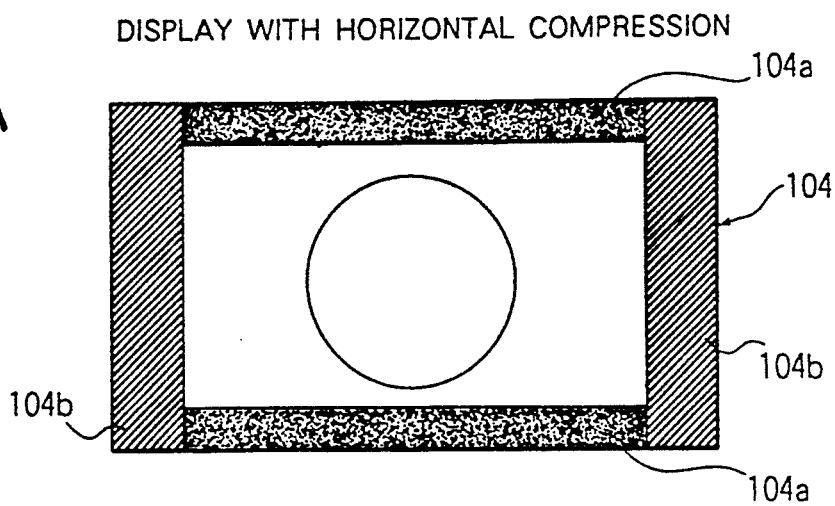
FIGS. 3A, 3B, and 3C are diagrams useful to explain a video image screen having an aspect ratio 16:9.
Figure 3B:
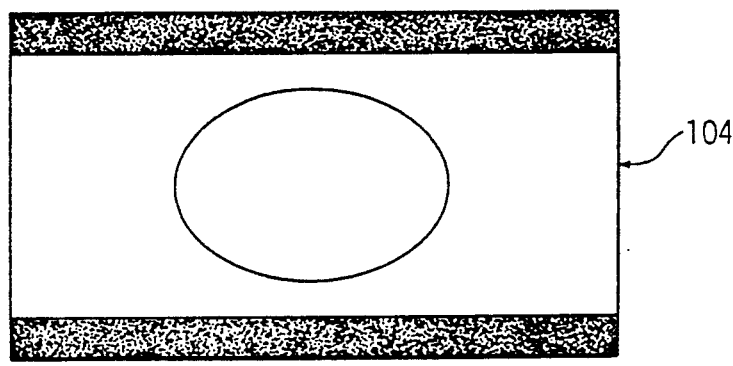
Figure 3C:
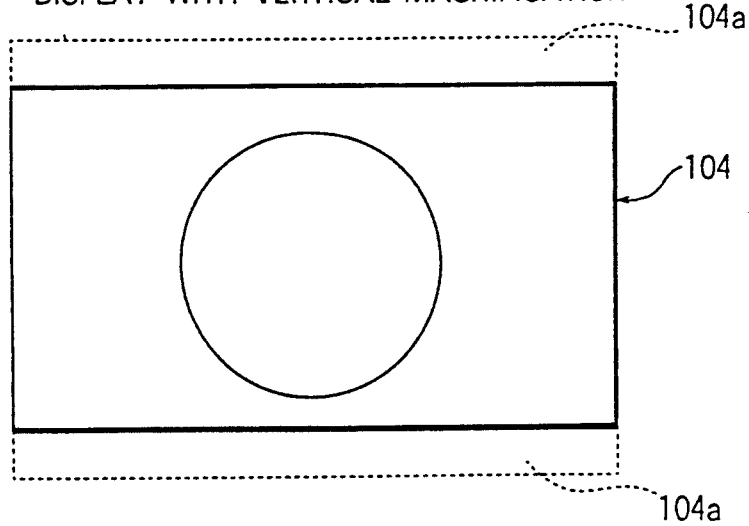

FIGS. 3A to 3C show examples of image output screens presented on the wide display 104.

FIGS. 3A, 3B, and 3C are a 1-field display screen showing a circle in a display with horizontal compression, in a display without horizontal compression, and in a display with vertical magnification.

In FIG. 3A, a video software signal of the Vista or CinemaScope size having an aspect ratio 4:3 and a blanking area 104a in the top and bottom portions is displayed on an elongated screen. Since the video signal is displayed with a horizontal compression, the blanking area 104 appears in the top and bottom portions of the screen and a frame signal 104b appears in the right and left end portions thereof, which lessens the screen utilization efficiency. For this purpose, display without horizontal compression of the video signal for the full range of the screen in the horizontal direction is shown in FIG. 3B. The display with vertical magnification of about 4/3 to remove the blanking areas 104a from the screen is shown in FIG. 3C which produces an image display of substantially the highest screen utilization efficiency.

In other words, when the circle of FIG. 3B is displayed with horizontal compression on a screen having an aspect ratio 16:9, the image of FIG. 3A is obtained. When an image of an aspect ratio 4:3 is presented on a screen having an aspect ratio 16:9, the image of FIG. 3B is developed. The screen utilization efficiency is less for the screen of FIG. 3A. To overcome this difficulty, the image of FIG. 3A is expanded in the horizontal direction and is magnified in the vertical direction, thereby attaining the image of FIG. 3C.

Subsequently, the configuration of the fixed frequency generating circuit 106 will be described in detail.

Figure 4A:
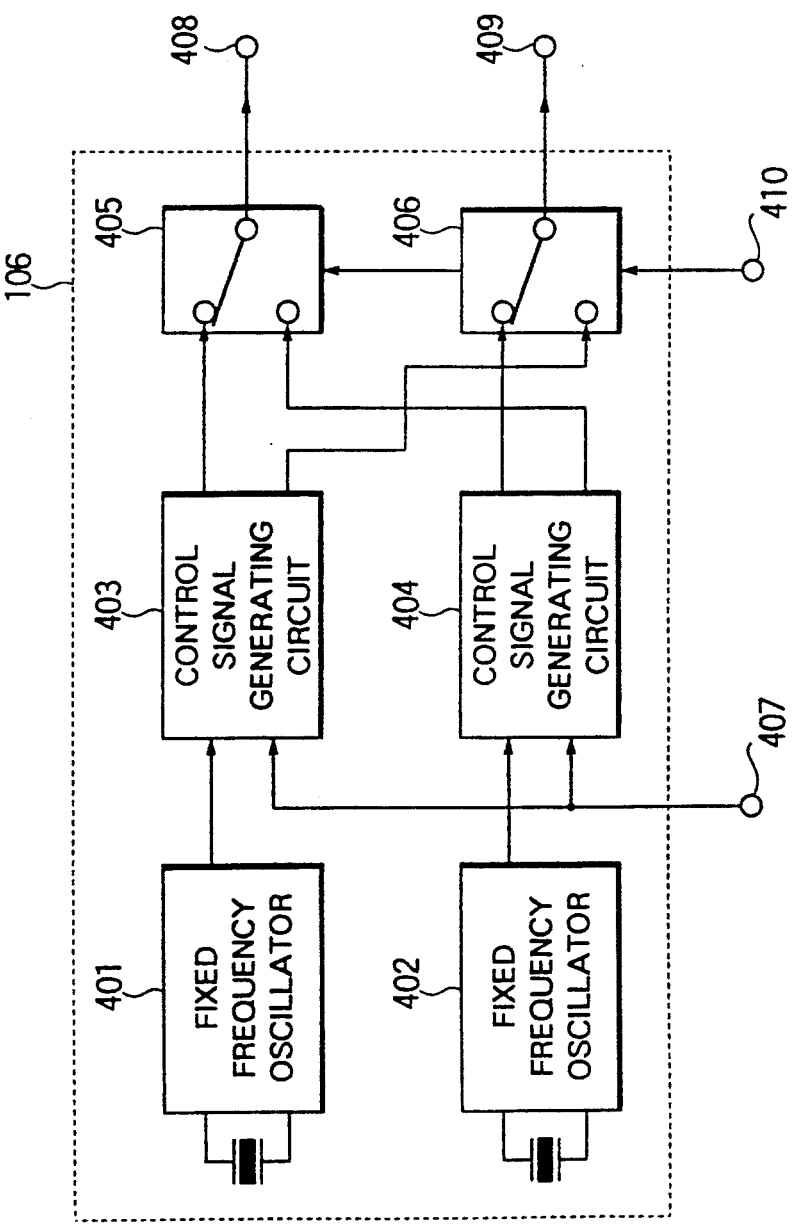
FIGS. 4A, 4B, and 4C are diagrams useful to explain a fixed frequency generating circuit and video image screens.
Figure 4B:
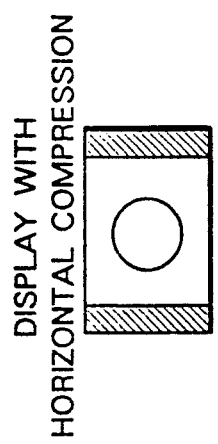
Figure 4C:
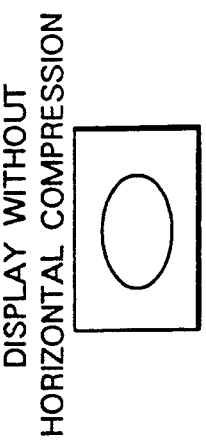

FIG. 4A includes fixed frequency oscillators 401 and 402, control signal generating circuits 403 and 404, selectors 405 and 406, a synchronizing signal input terminal 407 receiving a synchronizing signal from the synchronizing signal regenerating circuit 105, a read control signal output terminal 408 to the display format conversion memory circuit 103, a synchronizing signal output terminal 409 to the wide display 104, and a change-over signal input terminal 410 for the horizontal compression processing. FIGS. 4B and 4C show output screens established by the display format setting circuit 107 in the display with and without horizontal compression, respectively.

The fixed frequency oscillator 401 includes a crystal oscillator achieving a fixed-frequency oscillation at a frequency 8 fsc identical to that of the write clock signal reproduced by the sync reproducing circuit 105. In this regard, fsc stands for a frequency (3.579545 MHz) of a frequency subcarrier (fsc) used to transmit a color signal. The fixed frequency oscillator 402 includes a crystal oscillator achieving a fixed-frequency oscillation at a frequency $4/3 \times 8$ fsc. This frequency is an integral multiple of a horizontal frequency $f_H$ which is about 4/3 times the frequency of the oscillation achieved by the fixed frequency oscillator 401. The control signal generating circuits 403 and 404 are respectively responsive to outputs from the fixed frequency oscillators 401 and 402 to respectively produce clock and control signals for reading out video signals stored in the display format conversion memory circuit 103 and synchronizing signals for the wide display 104 so as to supply the generated signals to the selectors 405 and 406 as shown in FIG. 4A. The selectors 405 and 406 select, based on a change-over signal from the display format setting circuit 107, an output from the control signal generating circuit 404 when a display with horizontal compression of FIG. 4B is to be set; whereas, when a display without horizontal compression of FIG. 4C or a display with vertical magnification of FIG. 3C is to be set, an output from the control signal generating circuit 403 is selected so as to feed the control signal for a read operation and the synchronizing signal to the display format conversion memory circuit 103 and the wide display 104, respectively.

A feature of the fixed frequency generating circuit 106 described above resides in that two frequency oscillators 401 and 402 are employed such that assuming that the fixed frequency oscillator 401 has a fixed frequency 8 fsc, the fixed frequency of the fixed frequency oscillator 402 is set to $4/3 \times 8$ fsc. Moreover, depending on a setting of a video signal format to either one of a display with horizontal compression, a display without horizontal compression, and a display with vertical magnification, there are produced clock and control signals for a read operation for the display format conversion memory circuit 103 and synchronizing signals for the wide display 104. The oscillation frequencies respectively of the fixed frequency oscillators 401 and 402 are not limited to the frequencies above. Allowing a little deviation of the display aspect ratio on the display screen of the wide display 104, it is also possible to conduct the oscillation at frequency equal to an integral multiple of a horizontal frequency in the neighborhood of 8 fsc or in the vicinity of about $4/3 \times 8$ fsc.

Figure 4D:
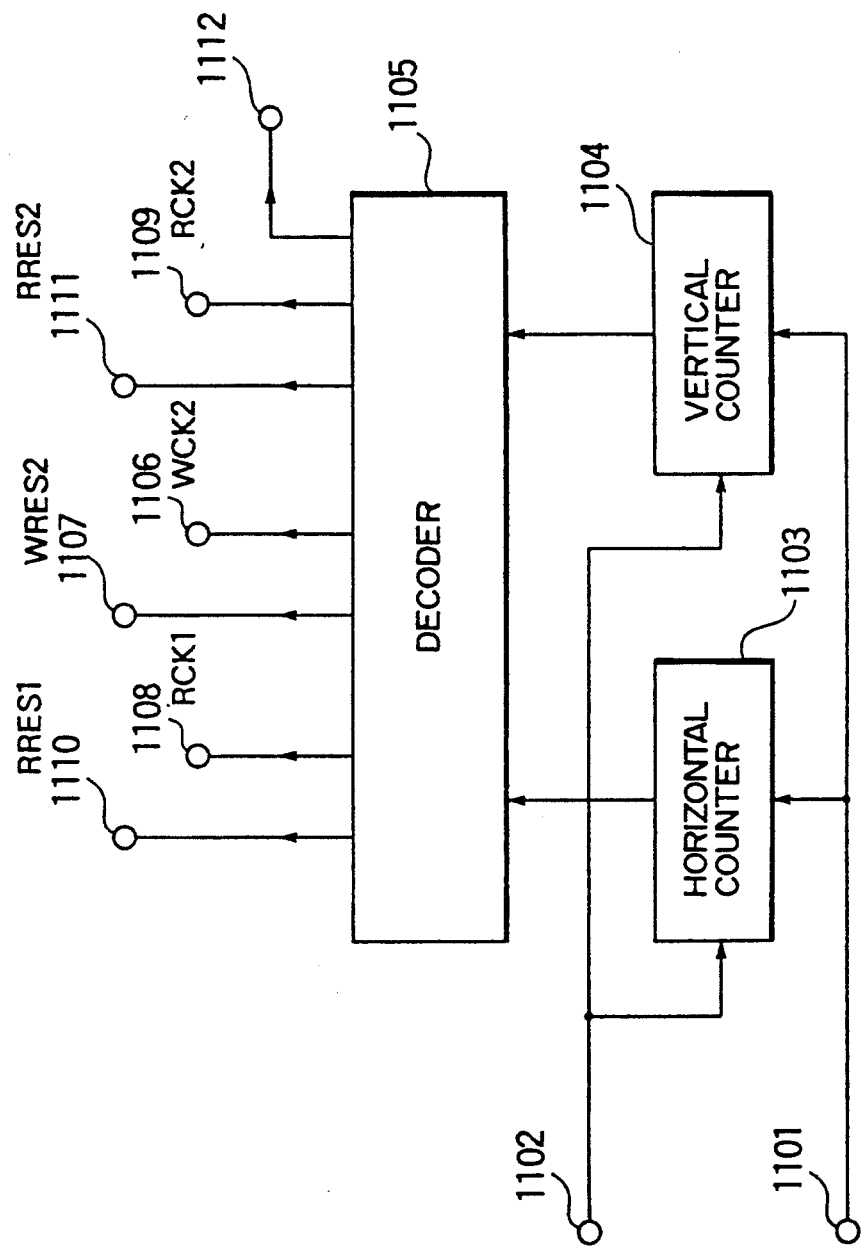
FIG. 4D is a block diagram showing a control signal generator.

The control signal generating circuits 403 and 404 are specifically described with reference to FIG. 4D. In FIG. 4D, a reference numeral 1101 denotes an input terminal for receiving a synchronization signal, 1102 an input terminal for receiving clock signals from the fixed frequency oscillators 401 and 402, 1103 a horizontal counter, 1104 a vertical counter, 1105 a decoder, 1106 an output terminal for outputting a write clock signal WCK2, 1107 an output terminal for outputting a write reset signal WRES2, 1108 and 1109 output terminals for outputting read clock signals RRES1 and RRES2 respectively, 1110 and 1111 output terminals for outputting read reset signals RRES1 and RRES2 respectively, and 1112 an output terminal for outputting a synchronization signal to the wide display 104.

The horizontal counter 1103 and vertical counter 1104 are reset by the synchronization signal reproduced in the synchronizing signal reproducing circuit 105 and supplied from the terminal 1101, and act on counting the clocks from the fixed frequency oscillator 402 to supply a counting signal to the decoder 1105. Accordingly, the decoder 1105 outputs the write clock signal WCK2, the write reset signal WRES2, the read clock signals RCK1 and RCK2, read reset signals RRES1 and RRES2, and the synchronization signal for the wide display 104 to the display format conversion memory circuit 103.

Next, the display format conversion memory circuit 103 will be described in detail.

Figure 5A:
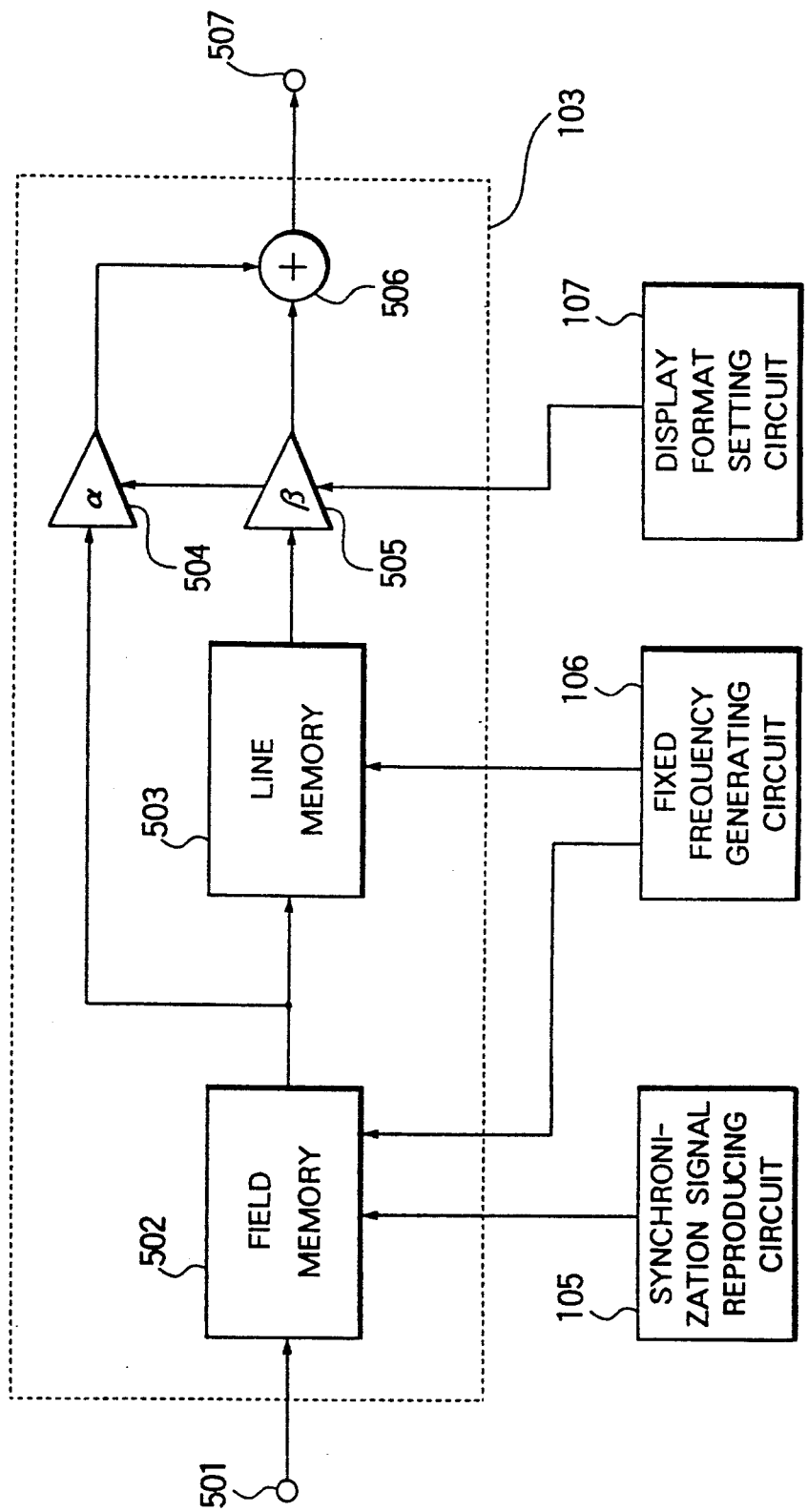
FIG. 5A is a block diagram showing a display format conversion memory.

FIG. 5A includes an input terminal 501 for receiving a double-speed video signal from the video signal processing circuit 103, a field memory 502, a line memory 503, coefficient circuits 504 and 505, an adder circuit 506, and an output terminal 507 for delivering a video signal to the wide display 104.

Next, the operation of the embodiment of FIG. 5A in the display with vertical magnification will be described by reference to states of scanning lines viewed from a cross-sectional plane.

FIGS. 5B to 5D respectively show a double-speed video signal inputted from the input terminal 501 to the field memory 502, a video signal outputted from the field memory 502, and a video signal outputted from the line memory 503. Moreover, FIG. 5E shows an addition result outputted from the adder circuit 506 via the coefficient circuits 504 and 505 when the display format setting circuit 107 establishes a display with vertical magnification. FIG. 5F shows an addition result output delivered from the adder circuit 506 when a display without vertical magnification is established.

The field memory 502 is configured such that, for example, when the vertical magnification processing is executed in the embodiment, after three scanning line signals are read from the stored video signals, a read operation of a scanning line signal is interrupted. As a result, the double-speed video signals of FIG. 5B are read from the field memory 502 in a form of FIG. 5C. In a period of time when an operation to read scanning line signals from the field memory 502 is not achieved, the fixed frequency generating circuit 106 controls the line memory 503 to repeatedly read out the previous scanning line signals, thereby obtaining line memory output signals of FIG. 5D. For the field memory output signals of FIG. 5C and the line memory output signals of FIG. 5D, the coefficient circuits 504 and 505 respectively set coefficients $\alpha$ and $\beta$ as shown in FIG. 5E. That is, the display format setting circuit 107 supervises the coefficient circuits 504 and 505 to vary the coefficients $(\alpha,\beta)$ for each scanning line in a sequence of $[(0,1), (\frac{3}{4},\frac{1}{4}), (\frac{1}{2},\frac{1}{2}), (\frac{1}{4},\frac{3}{4})]$. The adder circuit 506 produces four scanning line signals from the three scanning line signals outputted from the field memory 502. In this manner, the display format conversion memory circuit 103 accomplishes an interpolation of scanning line signals. As a result, the input video signal is multiplied in the vertical direction by about 4/3 to be supplied to the video signal output terminal 507. Moreover, in a case where the vertical magnification processing is not carried out, the read operation is not interrupted, namely, there is achieved a sequential read operation in the field memory 502 such that the coefficients $\alpha$ and $\beta$ are set respectively in the coefficient circuits 504 and 505 as shown in FIG. 5F. In short, the display format setting circuit 107 controls the coefficient circuits 504 and 505 to continuously set the coefficients $(\alpha,\beta)$ to $(1,0)$. As a result, the field memory output signal attained from the field memory 502 is directly outputted as a video signal for a display without vertical magnification to the video signal output terminal 507 without using the line memory 503.

The display format conversion memory circuit 103 described above has the following feature. Namely, the read and write operations of the field memory 502 are controlled to implement a display with horizontal compression and a display without horizontal compression. Moreover, a filtering section constituted with the line memory 503, the two coefficient circuits 504 and 505, and the adder circuit 506 accomplishes a signal filtering operation in the vertical direction to accomplish the interpolation of the scanning lines to achieve a display with vertical magnification.

In addition, a field memory having a random access function may be employed in place of the line memory 503. In this case, the field memory is arranged in parallel with the field memory 502 and the control signals are changed when required so as to implement a function similar to that described above.

The field memory 502 and the line memory 503 will be described in detail with reference to FIG. 6A. FIGS. 6B to 6H include terminal reference numerals each enclosed with parentheses for indicating terminals shown in FIG. 6A.

Figure 6A:
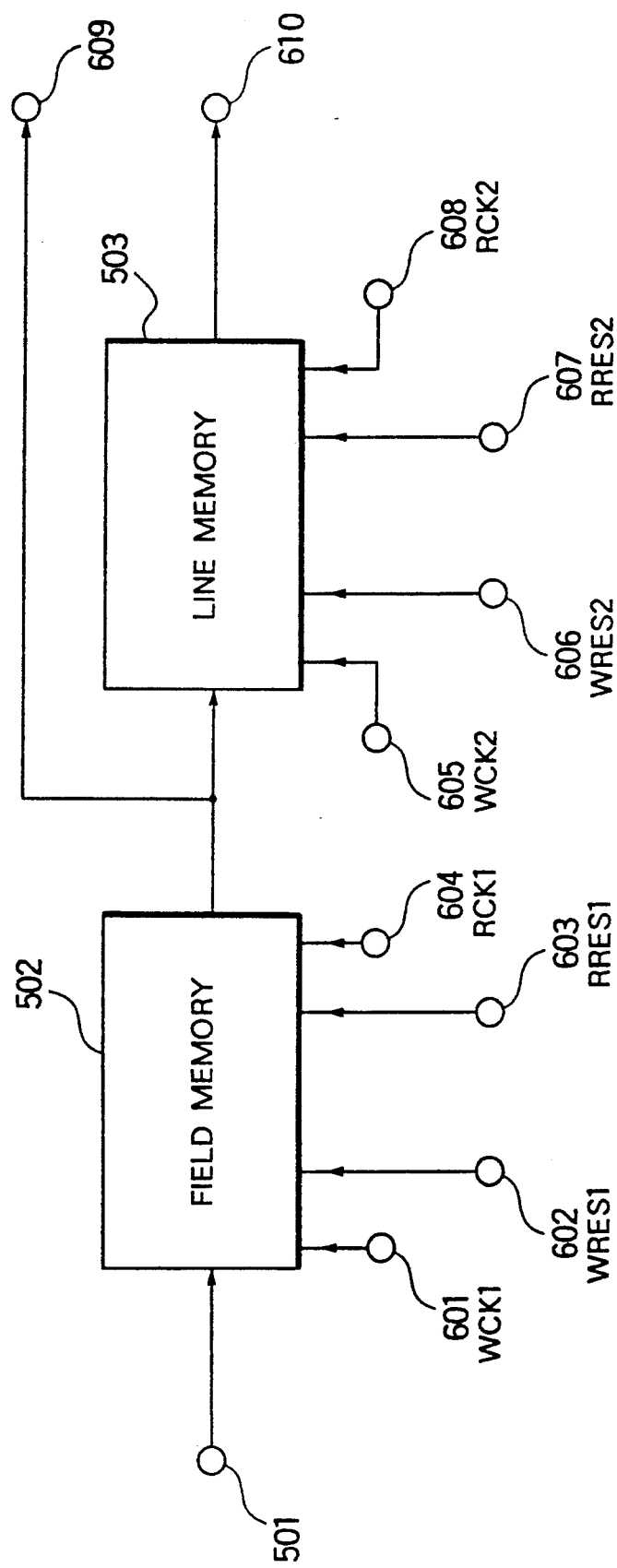
FIG. 6A is a block diagram showing a field memory and a line memory.

The field memory 502 of FIG. 6A includes a terminal 601 for receiving the write clock signal WCK1 and a terminal 602 for receiving the write reset signal WRES1. These signals are supplied from the synchronizing signal (sync) reproducing circuit 105. The configuration further includes a terminal 603 for receiving the read reset signal RRES1 and a terminal 604 for receiving the read clock signal RCK1. These signals are delivered from the fixed frequency generating circuit 106. Moreover, the system includes a terminal 608 for receiving a field memory output signal. The line memory 503 comprises a terminal 605 for receiving the write clock signalWCK2, a terminal 606 for receiving the write reset signal WRES2, a terminal 607 for receiving the read reset signal RRES2, and a terminal 608 for receiving the read clock signal RCK2. These signals are transmitted from the fixed frequency generating circuit 106. The configuration further includes a terminal 609 for outputting a field memory output signal and a terminal 610 for outputting a line memory output signal.

Referring now to timing charts of FIGS. 6B to 6H showing control and input/output signal timings, a description will be given of the operation of the field memory 502 of FIG. 6A when the display operation is conducted with and without a horizontal compression.

FIGS. 6B to 6D are timing charts of a double-speed video signal inputted from the video signal processing circuit 103, the write reset signal WRES1, and the read reset signal RRES1, respectively. Moreover, FIGS. 6F to 6H are timing charts respectively showing a field memory output signal inputted from the field memory 502 to the line memory 503 in a display with horizontal compression, the read clock signal RCK1 in a display without horizontal compression, and a field memory output signal inputted from the field memory 502 to the line memory 503 in a display without horizontal compression.

The double-speed video signal inputted from the terminal 501 shown in FIG. 6B is written in the field memory 502 in response to the 8 fsc write clock signal WCK1 and the write reset signal WRES1 of FIG. 6C. Furthermore, in a display with horizontal compression, the double-speed video signal is read from the field memory 105 in response to the read reset signal RRES1 of FIG. 6D and the read clock signal RCK1 of about 4/3×8 fsc shown in FIG. 6E. The field memory output signal obtained from the field memory 502 is a compressed video signal which is obtained by multiplying the original signal by about ¾ as shown in FIG. 6F. In a display without horizontal compression, in response to the read reset signal RRES1 of FIG. 6D and the 8 fsc read clock signal RCK1 of FIG. 6G, the video signal is read from the field memory 502. The field memory output signal thus outputted from the field memory 502 is a video signal not compressed in the horizontal direction as shown in FIG. 6H.

Next, referring to signal timing charts of FIGS. 7A to 7F showing control and input/output signal timings, a description will be given of operations of the field memory 502 and the line memory 503 when the display operation is conducted with vertical magnification in FIG. 6A. In this regard, FIGS. 7A to 7F include terminal reference numerals each enclosed in parentheses for indicating terminals of FIG. 6A.

FIGS. 7A to 7F respectively show a double-speed video signal supplied from the video signal processing circuit 102 of FIG. 1 to the field memory 502, a read clock signal RCK1, a field memory output signal outputted from the field memory 502, a write clock signal WCK2, a read clock signal RCK2, and a line memory output signal outputted from the line memory 503.

The double-speed video signal inputted from the input terminal and shown in FIG. 7A is written in the field memory 502 in response to the 8 fsc write clock signal WCK1 and the write reset signal WRES1. Depending on the read clock signal RCK1 including a 1H interruption for each 3H periods (horizontal scanning operation periods) shown in FIG. 7B, the field memory 502 outputs a field memory output signal of FIG. 7C. The line memory 503 is controlled by the write clock signal WCK2 of FIG. 7D and the read clock signal RCK2 of FIG. 7E such that the field memory output of FIG. 7C is delayed by a 1H period and the previous scanning line signals are repeatedly read out from the line memory 503 during a period when the field memory 502 does not deliver therefrom a field memory output. The line memory 503 resultantly outputs the line memory output as shown in FIG. 7F.

Features of the field memory 502 and the line memory 503 described above reside in that the double-speed video signal stored in the field memory 502 is read therefrom in a display with horizontal compression in response to a read clock signal RCK1 having a frequency (4/3×8 fsc) which is about 4/3 times that of the write clock signal WCK1. Moreover, in a display without horizontal compression, the double-speed video signal is read therefrom in response to a clock having a frequency 8 fsc) of the write clock signal WCK1. Furthermore, in a display with vertical magnification, the double-speed video signal is read therefrom in response to a read clock signal RCK1 including an interruption of a 1H period for each 3H periods (horizontal scanning operation period). In addition, in a display with vertical magnification, the output signal from the field memory 502 is written in the line memory 503 in response to the write clock signal WCK2 including an interruption of a 1H period for each 3H periods.

With the provisions of the circuit configuration and the control signals above, a video input signal having an aspect ratio 4:3 or 16:9 at the double-speed conversion is processed according to a format preset for a display with horizontal compression or a display with vertical magnification such that the aspect ratio of the signal is converted to be displayed a wide display having an aspect ratio 16:9. Moreover, the read control for the memory employed in the display format conversion processing is achieved, depending on a signal obtained by the fixed frequency oscillation, asynchronous to the video input signal. Consequently, for a video signal such as a VTR signal containing a large number of jitter components and skews, a high-quality image can be produced with a reduced image deviation or fluctuation.

Next, the special display function of the present invention will be described by reference to FIG. 8.

A feature of the special display function resides in a field memory disposed in the display format conversion circuit to implement such display functions as the stationary, zooming, and multiscreen displays in addition to the display with horizontal compression and the display with vertical magnification.

Figure 8:
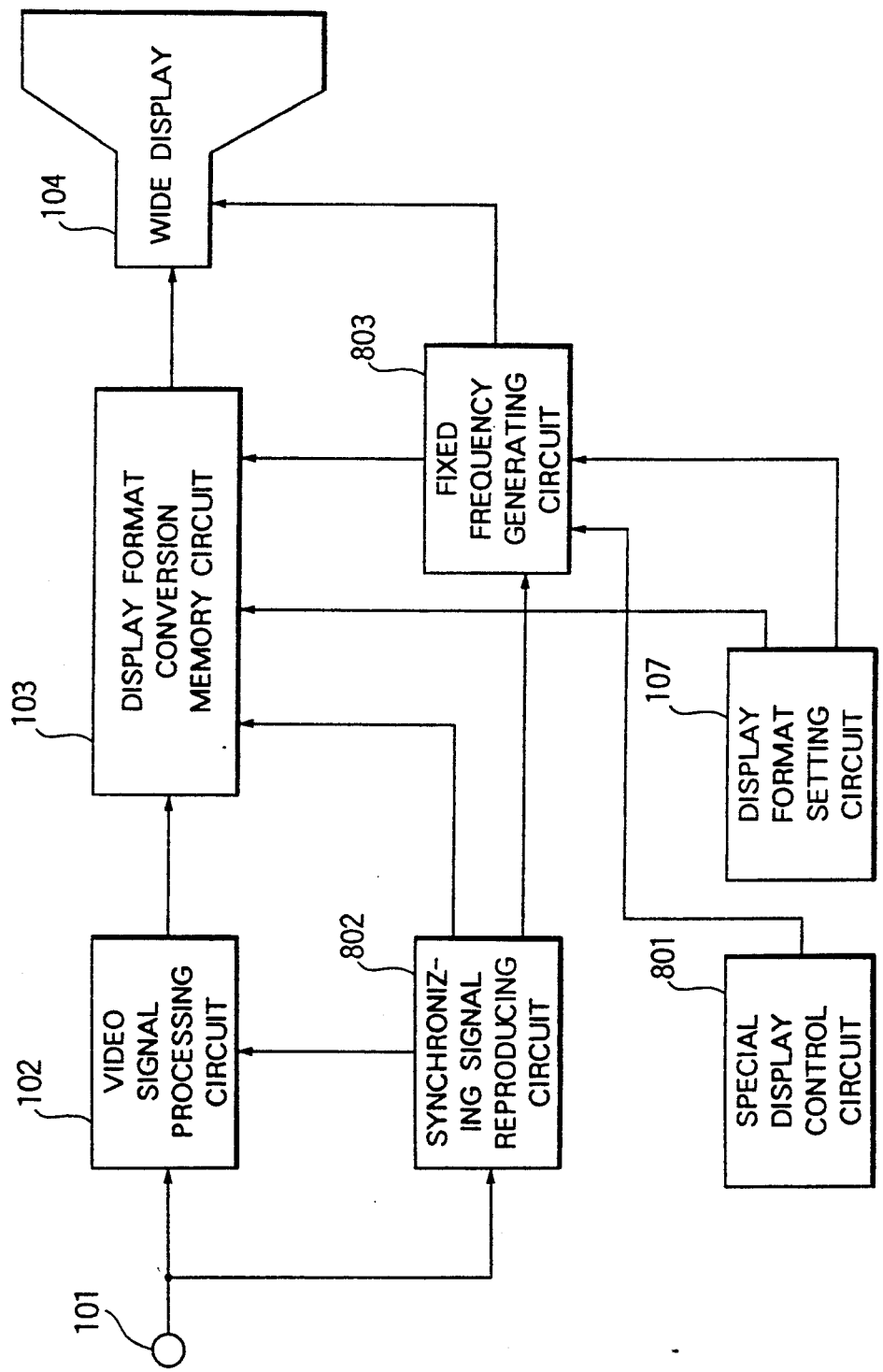
FIG. 8 is a block diagram showing a wide television receiver having special display functions.

FIG. 8 includes a special display control circuit 801, a sync reproducing circuit 802 for generating a synchronizing signal for the special display, and a fixed frequency generating circuit 803 for generating a fixed frequency for the special display.

The sync reproducing circuit 802 reproduces a synchronizing signal from a video input signal to supply the generated signal to the video signal processing circuit 102. In addition, the sync reproducing circuit 803 creates, based on the synchronizing signal and a special display control signal from the special display control circuit 801, clock and control signals for a write operation to deliver these signals to the display format conversion memory circuit 103. Moreover, the sync reproducing circuit 802 separates from the synchronizing signal a vertical synchronizing signal and a horizontal synchronizing signal. Depending on the special display control signal from the special display control circuit 801, a delay is applied to the vertical synchronizing signal and then the resultant signal is NANDed with the horizontal synchronizing signal. A signal attained from the NAND operation is supplied as a synchronizing signal to the fixed frequency generating circuit 803. Based on the fixed frequency generated from a fixed frequency generator, the special display control signal from the special display control circuit 801, and the synchronizing signal from the sync reproducing circuit 802, the fixed frequency generating circuit 803 generates write and read clock signals and a reset signal for the display format conversion memory circuit 103 associated with the horizontal compression display and the vertical magnification display. Under control of the display format setting circuit 107, the fixed frequency generating circuit 803 selects either one of the display formats to output the pertinent signals to the display format conversion memory circuit 103. Furthermore, the fixed frequency generating circuit 803 generates a synchronizing signal to supply the signal to the wide display 104.

First, in a case of the still image screen display, the special display control circuit 801 controls the sync reproducing circuit 802 to interrupt the write clock WCK1 for the field memory 502 of the display format conversion memory circuit 103 (FIG. 6A). In this connection, for example, it may also be possible that the control signal produced for the still screen from the special display control circuit 801 is ANDed with the write clock WCK1 for the field memory 502 of FIG. 6A to use the resultant signal as the write clock WCK1 for the field memory 502.

Moreover, the system may be configured as follows. Namely, the synchronizing signal at the initiation of the still screen display is set to the selfrunning state such that even when a change-over to another television station occurs during the still screen display, the synchronization can be established, thereby implementing the still screen display function with an increased stableness.

Subsequently, description will be given of the operation in the zooming screen display.

Figure 9A:
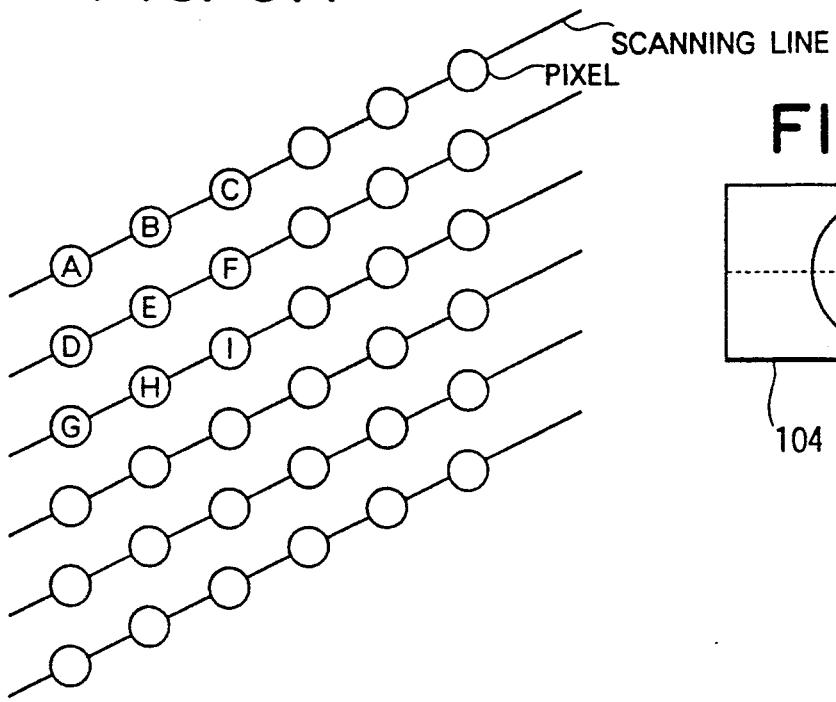
FIGS. 9A and 9B are diagrams used for explaining states of video signals in a one-field screen and display screens in an operation ordinarily displaying a zoomed screen image.
Figure 9B:
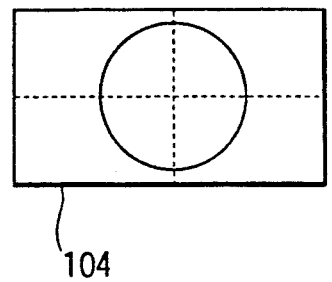
Figure 9C:
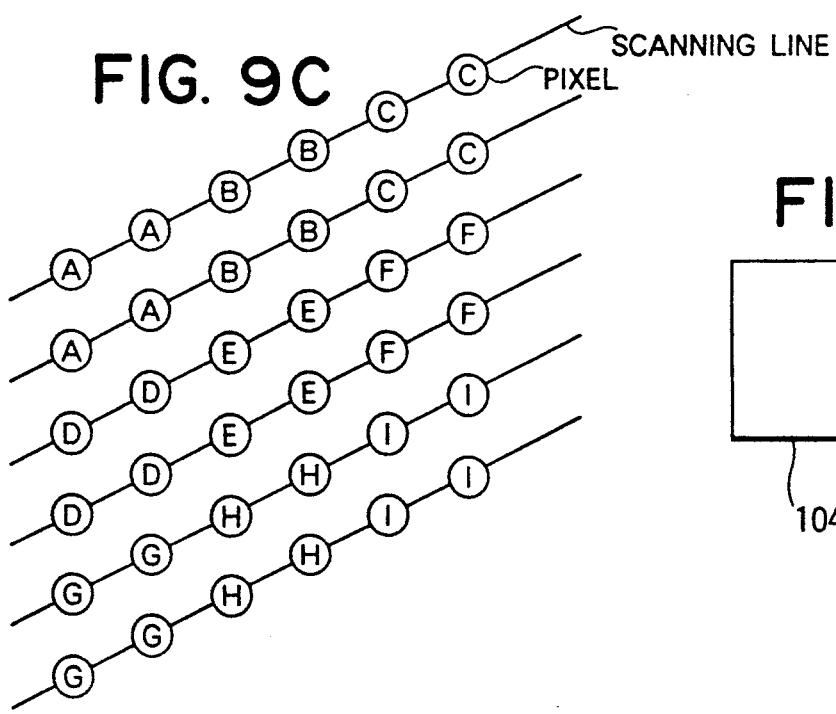
FIGS. 9C and 9D are diagrams use to explaining states of video signals in a one-field screen and display screens in an operation displaying a zoomed screen image with a magnification factor set to four.
Figure 9D:
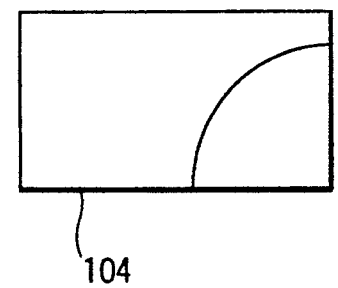

FIGS. 9A and 9B respectively show video signals in a 1-field screen in the ordinary display and a display screen thereof. FIGS. 9C and 9D show video signals in a 1-field screen in a quadruple magnification display and a display screen thereof, respectively.

In FIGS. 8 and 6A, the special display control circuit 801 supervises the fixed frequency generating circuit 803 controlling a read operation of video signals stored in the field memory 502 and a write operation on the line memory 503. For example, when the special display control circuit 801 supplies control signals to the fixed frequency generating circuit 803 for the following purposes. Namely, in order to achieve a read operation to acquire video signals A, B, C, D, E, F, G, H, I, etc. loaded in the field memory 502 as shown in FIG. 9A, the read clock signal RCK1 is produced to generate the ordinary read clock signal RCK1 for each scanning line; moreover, to write data in the line memory 503, the write clock signal WCK2 is created to generate the ordinary write clock signal WCK2 for each scanning line; furthermore, to read data therefrom, there is generated a clock signal having a frequency equal to half that of the ordinary read clock signal RCK2. Resultantly, as shown in FIG. 9D, there can be easily achieved a double-write display operation in the horizontal and vertical directions to attain a quadruple-size display. In addition, depending on the control operation of the fixed frequency generating circuit 106 of FIG. 1, the magnification factor may be set to 4, 9, 16, etc.

Furthermore, description will be given of a case of the multiscreen display in which the screen is subdivided into nine partitions.

Figure 10C:
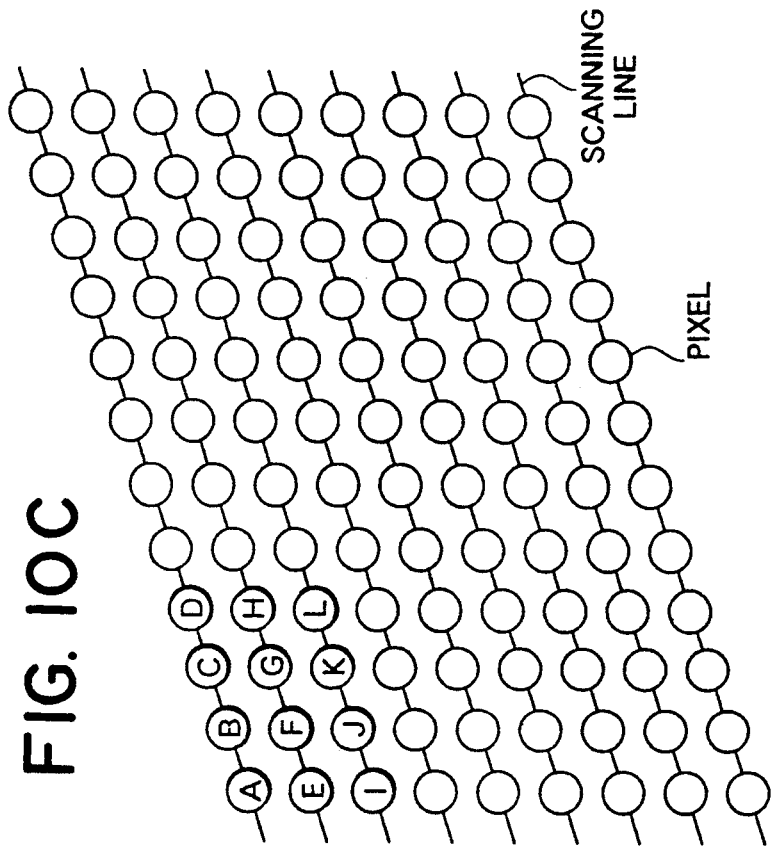
FIGS. 10C and 10D are diagrams used for explaining states of video signals in a one-field screen and display screens when a multi-screen having nine partitions is displayed.
Figure 10D:
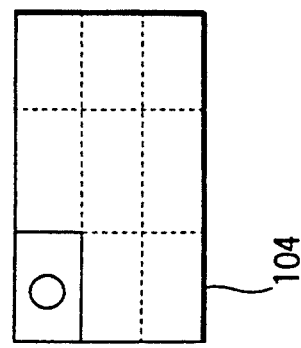
Figure 10A:
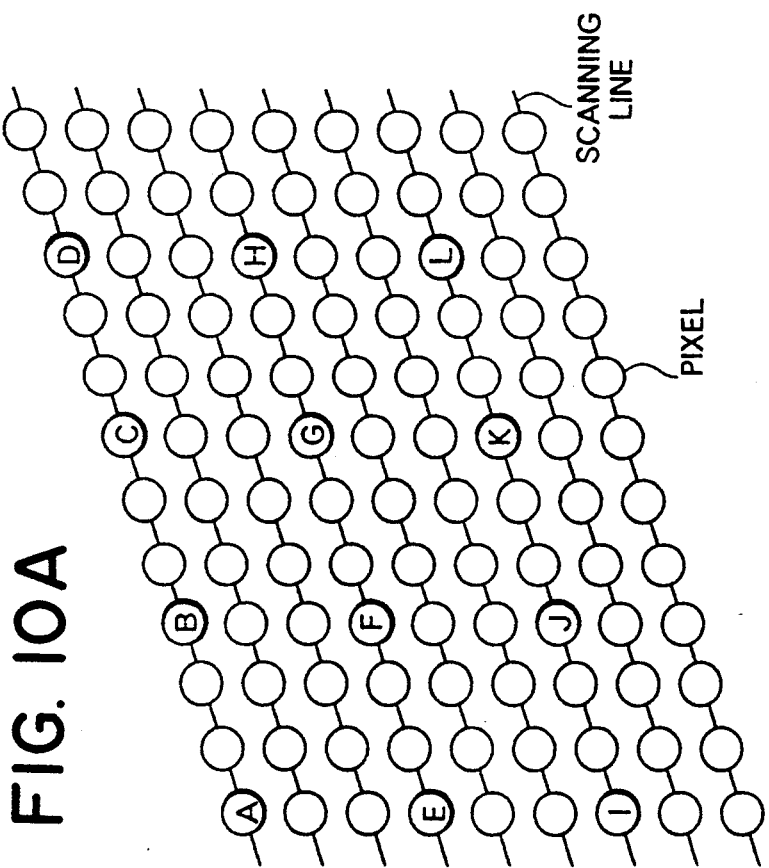
FIGS. 10A and 10B are diagrams for explaining states of video signals in a one-field screen and display screens when a multi-screen is ordinarily displayed.
Figure 10B:
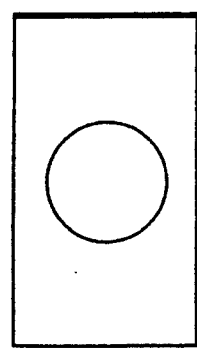

FIGS. 10A and 10B respectively show video signals in a 1-field screen in the ordinary display and a display screen thereof. FIGS. 10C and 10D show video signals in a 1-field screen in a 9-partition multiscreen display and a display screen thereof, respectively.

In FIGS. 8 and 6A, the special display control circuit 801 supervises the sync reproducing circuit 802 controlling a write operation in the field memory 502 of the display format conversion memory circuit 103. For example, when the special display control circuit 801 supplies control signals to the sync reproducing circuit 802 for the following operations. Namely, to load the field memory 502 with video signals A, B, C, D, E, F, G, H, I, J, K, L, etc. obtained by thinning out video signals outputted from the video signal processing circuit (FIG. 10B), there is produced a write clock signal WCK2 which has a frequency equal to ⅓ that of the ordinary write clock signal WCK2 and which is generated for every three scanning lines. After the field memory output signal is obtained from the field memory, the system conducts the regular processing to display a screen image signal in one of the nine partitions of the 9-partition screen, thereby achieving the multiscreen display. In addition, the number of partitions and hence the size of each partition can be determined depending on the control of the sync reproducing circuit 802, namely, the overall screen may be subdivided into four partitions, 16 partitions, and so on.

As above, as a memory for materializing the special display function, there is adopted the field memory 502 in the display format conversion memory circuit 103 enabling the aspect ratio conversion processing. Moreover, the special display control circuit 801 is configured to control an interruption of a write/read operation in the field memory 502 and a change in the clock frequency.

According to the embodiments described above, there can be provided a wide television receiver in which for an input signal containing a large number of jitter components and skews, an efficient aspect ratio conversion is conducted such that the image deviation of fluctuation is suppressed when the video signal is displayed. In addition, there can be provided a wide television receiver in which a filtering operation is achieved to produce an interpolation video signal so as to attain a vertical magnification display with quite a fine picture quality. Moreover, using a memory for the display conversion processing, the system is configured to control the memory to provide a wide television receiver having the special display function such as the still image display, the zooming screen display, and the multiscreen display.

While particular embodiments of the invention have been shown and described, it will be obvious to those skilled in the art that various changes and modifications may be made without departing from the present invention in its broader aspects.

We claim:

1. Signal processor for a wide television receiver comprising:
   display means including a wide aspect ratio;
   a video signal processing circuit for producing a real scanning line signal and an interpolation scanning line signal from a video signal;
   a display format conversion memory circuit for converting a video signal from said video signal processing circuit into either one of display formats respectively for a display with horizontal compression, a display without horizontal compression, and a display with vertical magnification with each of the display formats having the wide aspect ratio to be presented on said display means;
   a sync reproducing circuit for reproducing a synchronizing signal included in the video signal and supplying the synchronizing signal to said vide signal processing circuit and to said display format conversion memory circuit for a synchronization of an operation storing the video signal to control a writing operation of the video signal to said display format conversion memory circuit;
   a fixed frequency generating circuit producing a fixed frequency control signal controlling a read operation of the video signal from said display format conversion memory circuit in response to the synchronizing signal from said sync reproducing circuit, and a synchronizing signal for a display operation of said display means; and
   a display format setting circuit for generating setting signals to execute a selection of a display format employed in the conversion in said display format conversion memory circuit and a selection of either one of the control signals outputted from said fixed frequency generating circuit.

2. A signal processor for a wide television receiver according to claim 1 wherein said fixed frequency generating circuit comprises:
   fixed frequency generators for respectively generating first and second fixed frequencies;
   a control signal generating circuit for producing first and second read control signals respectively associated with the first and second fixed frequencies for the read operation of the video signal stored in said display format conversion memory based on the first and second fixed frequencies respectively outputted from said fixed frequency generators and the synchronizing signal from said sync reproducing circuit; and
   selectors each for carrying out a change-over operation between the first and second read control signals respectively outputted from said control signal generating circuit in response to setting signals from said display format setting circuit for outputting a selected signal to said display format conversion memory for the read operation of the video signal stored in said display format conversion memory.

3. A signal processor for a wide television receiver according to claim 1 wherein said display format conversion memory circuit comprises:
   a first memory for storing therein the video signal from said video signal processing circuit and reading therefrom a scanning signal associated with the video signal in response to the synchronizing signal from said sync reproducing circuit and a read control signal from said fixed frequency generating circuit;
   a second memory for storing therein the video signal from said first memory and reading therefrom a previous scanning line preceding the scanning line related to the video signal in response to the read control signal when the scanning line related to the video signal stored in said first memory is not read therefrom;
   a first coefficient circuit for sequentially multiplying the scanning line signal read from said first memory by first coefficients each of which are different and outputting the video signals in either one of the display formats respectively for a display with horizontal compression, a display without horizontal compression, and a display with vertical magnification based on the setting signals from said display format setting circuit;
   a second coefficient circuit for sequentially multiplying the scanning line signal read from said second memory by second coefficients each of which are different and outputting the video signals in either one of the display formats respectively for a display with horizontal compression, a display without horizontal compression, and a display with vertical magnification based on the setting signals from said display format setting circuit; and
   an adder circuit for adding an output signal from said first coefficient circuit to an output signal from said second coefficient circuit for producing a video signal in an interpolated format.

4. A signal processor for a wide television receiver according to claim 3 wherein said second memory stores the video signal read from said first memory for at least a horizontal scanning period.

5. A signal processor for a wide television receiver according to claim 3 wherein said fixed frequency generating circuit comprises:
   fixed frequency generators for respectively generating first and second fixed frequencies;
   a control signal generating circuit for producing the synchronizing signal from said sync reproducing circuit, the special display control signal from said special display control circuit, and first and second memory control signals respectively associated with the first and second fixed frequencies for the display format conversion memory circuit based on the first and second fixed frequencies respectively outputted from said fixed frequency generators; and selectors each for carrying out a change-over operation between the first and second memory control signals respectively outputted from said control signal generating circuits in response to setting signals from said display format setting circuit for outputting a selected signal to said display format conversion memory.

6. Signal processor for a wide television receiver comprising:

display means having a wide aspect ratio;

a video signal processing circuit for producing a real scanning line signal and a interpolation scanning line signal from a video signal;

a special display control circuit for generating special display control signals in display formats at least associated with a still screen display, a zooming screen display and a multiscreen display;

a display format conversion memory circuit for converting a video signal from said video signal processing circuit into either one of display formats respectively for a display with horizontal compression, a display without horizontal compression and a display with vertical magnification with each of the display formats having the wide aspect ratio to be presented on said display means;

a sync reproducing circuit for reproducing a synchronizing signal included in the video signal, supplying the synchronizing signal to said video signal processing circuit, and supplying a synchronizing signal produced from the synchronizing signal and the special display control signals generated from said special display control circuit to said display format conversion memory circuit to control a writing operation of the video signal to said display format;

a fixed frequency generating circuit producing a fixed frequency memory control signal controlling a read operation of the video signal from said display format conversion memory circuit in response to the synchronizing signal from said sync reproducing circuit and a synchronizing signal for said display means; and a display format setting circuit for generating setting signals to execute a selection of a display format employed in the conversion in said display format conversion memory circuit and a selection of either one of the control signals outputted from said fixed frequency generating circuit.

* * * * *